US012776172B2

(12) United States Patent
Hansen et al.

(10) Patent No.: US 12,776,172 B2
(45) Date of Patent: Oct. 27, 2026

(54) GAPLESS ASYNCHRONOUS DATA RECORDING

(71) Applicant: Textron Aviation Inc., Wichita, KS (US)

(72) Inventors: Mark Christopher Hansen, Wichita, KS (US); Adam Blake Wolfe, Bentley, KS (US); Haines Todd, Derby, KS (US)

(73) Assignee: Textron Innovations Inc., Providence, RI (US)

( * ) Notice: Subject to any disclaimer, the term of this patent is extended or adjusted under 35 U.S.C. 154(b) by 126 days.

(21) Appl. No.: 18/966,264

(22) Filed: Dec. 3, 2024

(65) Prior Publication Data

US 2025/0191423 A1 Jun. 12, 2025

Related U.S. Application Data

(60) Provisional application No. 63/609,316, filed on Dec. 12, 2023.

(51) Int. Cl.
*G07C 5/08* (2006.01)
*G07C 5/00* (2006.01)
*H04L 67/55* (2022.01)
*H04L 67/568* (2022.01)

(52) U.S. Cl.
CPC ............... *G07C 5/08* (2013.01); *G07C 5/008* (2013.01); *H04L 67/55* (2022.05); *H04L 67/568* (2022.05)

(58) Field of Classification Search
CPC ........... G07C 5/008; G07C 5/08; H04L 67/55; H04L 67/568
See application file for complete search history.

(56) References Cited

U.S. PATENT DOCUMENTS

| | | | | |
|---|---|---|---|---|
| 10,083,048 | B2 | 9/2018 | Standley et al. | |
| 10,630,565 | B2 | 4/2020 | Cox et al. | |
| 11,226,614 | B2 | 1/2022 | Bouzon et al. | |
| 11,532,186 | B1 * | 12/2022 | Wiegman | G07C 5/0808 |
| 2003/0065428 | A1 * | 4/2003 | Mendelson | G05D 1/0055 701/9 |
| 2019/0130767 | A1 * | 5/2019 | Letsu-Dake | B64F 5/60 |
| 2021/0037108 | A1 | 2/2021 | Li et al. | |
| 2022/0075628 | A1 | 3/2022 | Adams | |
| 2022/0180647 | A1 * | 6/2022 | Al-Husseini | G06V 20/41 |
| 2023/0073566 | A1 * | 3/2023 | Sivasithambaresan | G06F 16/258 |

* cited by examiner

*Primary Examiner* — Mohamed A. Wasel
(74) *Attorney, Agent, or Firm* — Avek IP, LLC

(57) ABSTRACT

An aircraft recording system provides gapless asynchronous data recording. A data acquisition system is connected to a data ingestion interface, such that data acquisition system captures avionics data. An endpoint is associated with the aircraft data acquisition system and located remotely from the aircraft, which persists the plurality of events. An asynchronous messaging platform is provided that is adapted to digest and publish a plurality of packet payload words. A data file caching system is provided that is adapted to cache aircraft data files by ingesting data from the asynchronous messaging platform, writing the ingested data to a cache buffer, and based on a determination that a file descriptor is available, flushing the cache buffer to the file descriptor. A data file persistence system persists the aircraft data files by claiming the file descriptor, flushing the cache buffer to physical storage, and releasing the file descriptor.

20 Claims, 7 Drawing Sheets

GAPLESS ASYNCHRONOUS DATA RECORDING

CROSS-REFERENCE TO RELATED APPLICATIONS

This application claims the benefit of U.S. Provisional Patent Application No. 63/609,316, filed Dec. 12, 2023, the entire contents thereof are herein incorporated by reference.

BACKGROUND

1. Field

Embodiments of the invention relate generally to gapless asynchronous data recording, and more specifically to software that allows data to be buffered and synchronized later, thereby preventing formation of gaps within data files due to process interruptions caused by writes to media.

2. Related Art

Various methods of data recording are known. U.S. Pat. No. 10,083,048 to Standley et al. (hereinafter "Standley") describes systems and methods for receiving and processing multiple input streams which may be referred to as services. Standley identifies a possibility of input streams interfering with each other and describes a method for handling these interactions. Standley does not disclose any mechanism to allow data to be buffered and remotely synchronized at a later time.

U.S. Pat. No. 10,630,565 to Cox et al. (hereinafter "Cox") describes systems and methods for detecting and handling overload conditions in data collection/processing gateways. The disclosure of Cox relates to Internet-of-Things (IoT) applications. Cox describes an IoT device having processing capability and memory relating to methods for responding to an overload condition. Cox does not disclose specific mechanisms for buffering and subsequently synchronizing data.

U.S. Pat. No. 11,226,614 to Bouzon et al. (hereinafter "Bouzon") describes systems and methods for collecting, processing, and storing data generated by industrial processes by using smart nodes that include processing capability as well as memory. Bouzon describes methods for managing data and responding to problems. Bouzon does not disclose or suggest specific mechanisms to allow data to be buffered and synced later.

U.S. Patent Publication No. 2021/0037108 to Li et al. (hereinafter "Li") describes systems and methods for collecting, processing, and storing large data sets in the context of data generated by self-driving cars. Li discloses an architecture including a layer of proxy servers that download data to server groups. Li discloses methods for handling situations where a data backlog is present, and a write instruction must be delayed. Li does not disclose mechanisms to allow data to be buffered and synced later.

U.S. Patent Publication No. 2022/0075628 to Adams et al. (hereinafter "Adams") describes systems and methods for managing processes among embedded systems having an executive system that manages the underlying embedded systems. Adams describes sending and receiving data as well as serializing and deserializing the data. Adams does not disclose mechanisms to allow data to be buffered and synced later.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In particular, an embodiment includes an aircraft recording system providing gapless asynchronous data recording, the aircraft recording system comprising: at least one aircraft data acquisition system operatively coupled to a data ingestion interface, wherein the aircraft data acquisition system captures avionics data regarding a plurality of events associated with operation of an aircraft, at least one data acquisition endpoint associated with the aircraft data acquisition system and located remotely from the aircraft, the data acquisition endpoint capable of persisting the plurality of events associated with the operation of the aircraft, at least one asynchronous messaging platform adapted to digest and publish a plurality of packet payload words, at least one aircraft data caching system adapted to cache aircraft data by ingesting data from the asynchronous messaging platform, writing the ingested data to a cache buffer, and at least one aircraft data file persistence system adapted to persist the aircraft data files by claiming the file descriptor, flushing the cache buffer to physical storage, and releasing the file descriptor.

Another embodiment includes a method for providing gapless asynchronous data recording, the method comprising: establishing one or more connections to one or more avionics data sources, continually polling network data packets that are received from the one or more connections to one or more avionics data sources, digesting a plurality of packet payload words associated with the network data packets, publishing the plurality of packet payload words to an asynchronous messaging platform, ingesting the plurality of packet payload words from the asynchronous messaging platform to produce ingested data, writing the ingested data to one or more cache buffers, based on a determination that a file descriptor is available flushing the cache buffer to the available file descriptor, based on an instruction to sync the avionics data to physical media, claiming the file descriptor, flushing the cache buffer to physical storage, and releasing the file descriptor.

Yet another embodiment includes one or more non-transitory computer-readable media storing computer-executable instructions that, when executed by a processor, perform a method for providing gapless asynchronous data recording, the method comprising: establishing one or more connections to one or more avionics data sources, continually polling network data packets that are received from the one or more connections to one or more avionics data sources, digesting a plurality of packet payload words associated with the network data packets, publishing the plurality of packet payload words to an asynchronous messaging platform, ingesting the plurality of packet payload words from the asynchronous messaging platform to produce ingested data, writing the ingested data to one or more cache buffers, based on a determination that a file descriptor is available flushing the cache buffer to the available file descriptor, based on an instruction to sync the avionics data to physical media, claiming the file descriptor, flushing the cache buffer to physical storage, and releasing the file descriptor.

BRIEF DESCRIPTION OF THE DRAWING FIGURES

Embodiments of the invention are described in detail below with reference to the attached drawing figures, wherein.

Figure 1:
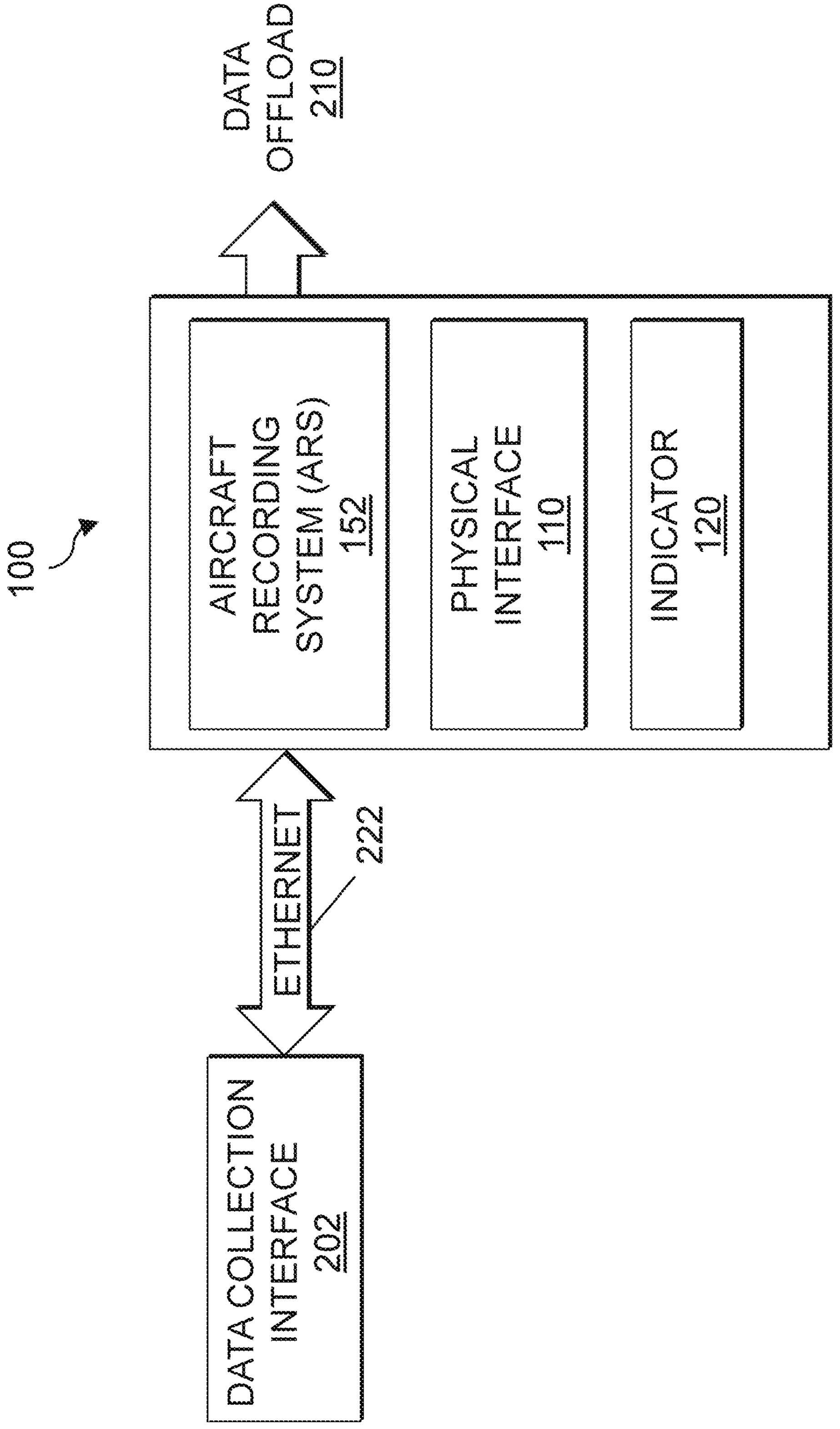
FIG. 1 depicts a block diagram for an aircraft data recording device, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

FIG. 1 is a block diagram illustrating an aircraft recording system (ARS) device 100 having configurable real-time file offload prioritization. The ARS device 100 relates to a data acquisition and recording system designed to be installed in aircraft such as commercial and/or general aviation aircraft. Frequently, such an ARS device 100 would be intended to be permanently installed in an aircraft. In some circumstances, multiple ARS devices 100 may be installed in an aircraft. ARS device 100 comprises an aircraft recording system (ARS) 152, a physical interface 110, and an indicator 120, described below.

ARS 152 is configured to receive and record data for retrieval and analysis, such as post-flight retrieval and analysis. ARS 152 comprises a microprocessor unit 154 having a non-transitory memory (e.g., a Flash Memory) configured for storing received data and a processor (e.g., a microcontroller) configured for processing software instructions (e.g., applets) as further described below in connection with FIG. 3. ARS 152 is configured to receive many types of avionics and diagnostics data from multiple sources. For example, ARS 152 may receive and record data from ARINC 429, ARINC 717, controller area network (CAN), and other data buses (e.g., using proprietary protocols), as well as discrete data sources.

As shown in the FIG. 1 embodiment, ARS 152 may receive data from a data collection interface 202 via ethernet connectivity pathway 222. The ethernet connectivity pathway 222 enables data to be multiplexed from data collection interface 202 without data loss. The data collection interface 202 may comprise one or more data buses that provide data collection and optionally data concentration (e.g., via multiplexing). An aircraft may be equipped with multiple data collection interfaces 202 dispersed in remote locations throughout the aircraft (i.e. remotely located from the cockpit or a centralized computing station onboard the aircraft), which provides shorter wire paths from many input sources (e.g., sensors) leading to an overall reduction in wire weight.

Stored data may be retrieved from ARS 152 via a data offload pathway 210. Data offload pathway 210 may include but is not limited to a removable mass storage module, a wireless interface (e.g., 802.11 WiFi, LTE or GSM cellular connection, wirelessly through the Iridium satellite constellation), or a wired transport mechanism such as universal serial bus (USB), local area network (LAN), ethernet, etc.

ARS device 100 consistent with the present teachings may be advantageously used by various types of users. Customer service technicians may use the recorded data to troubleshoot notifications from the field regarding aircraft functionality. Flight data may be analyzed or archived during aircraft manufacture or pre-delivery. Manufacturing personnel may use the system to run functional tests, and engineers may use the data in investigating system anomalies. ARS 152 consistent with the present teachings may employ one or more data collection interface boards, which may be connected by LAN, and which may interact with additional hardware and/or software interfaces which may be located onboard an aircraft. ARS 152 may be capable of receiving and/or transmitting data on multiple types of avionics data buses, such as: ARINC 429, ARINC 717, CAN, and other data buses. Consistent with the present teachings, data of different types may be recorded in a scalable manner and with full native rate sampling and full instrumentation.

The physical interface 110 is, for example, a physical button or switch disposed on an outer surface of the ARS device 100. In embodiments, physical interface 110 is a software-configurable push button, which may also be context sensitive for performing different actions depending on the context. Co-pending U.S. Provisional Patent Application No. 63/585,496, entitled "Aircraft Recording System Context-Sensitive Interface for Rapid Configuration", and filed Sep. 26, 2023, discloses additional details of physical interface 110 and ARS device 100 and is herein incorporated by reference in its entirety.

A pilot event button may be provided in embodiments such that a user (e.g., a pilot) may press the pilot event button when a certain event is observed, prompting recently recorded data to be offloaded via offload pathway 210. For example, the pilot event button may be located in the aircraft cockpit and wired to the ARS device 100 as a discrete input such that the pilot may initiate offloading of data to capture an observed event.

The indicator 120 is, for example, one or more lamps or lights disposed on an outer surface (e.g., a façade) of the ARS device 100. In embodiments, each of the one or more lights comprise a light-emitting diode (LED). Different states of the indicator 120 may be used to indicate different states of the ARS device 100. For example, the indicator 120 may be illuminated when the ARS device 100 is powered on and the indicator 120 may be off when the ARS device 100 is powered off. The indicator 120 may flash on and off to indicate different states, and the rate of flashing on/off may be used to indicate different states. For example, a slow flashing may indicate that the power is on, and data are actively being recorded; a rapid flashing may indicate that data are being written to a connected device (e.g., a connected USB drive). Other system states of ARS device 100 may be indicated via indicator 120 without departing from the scope hereof.

Figure 2:
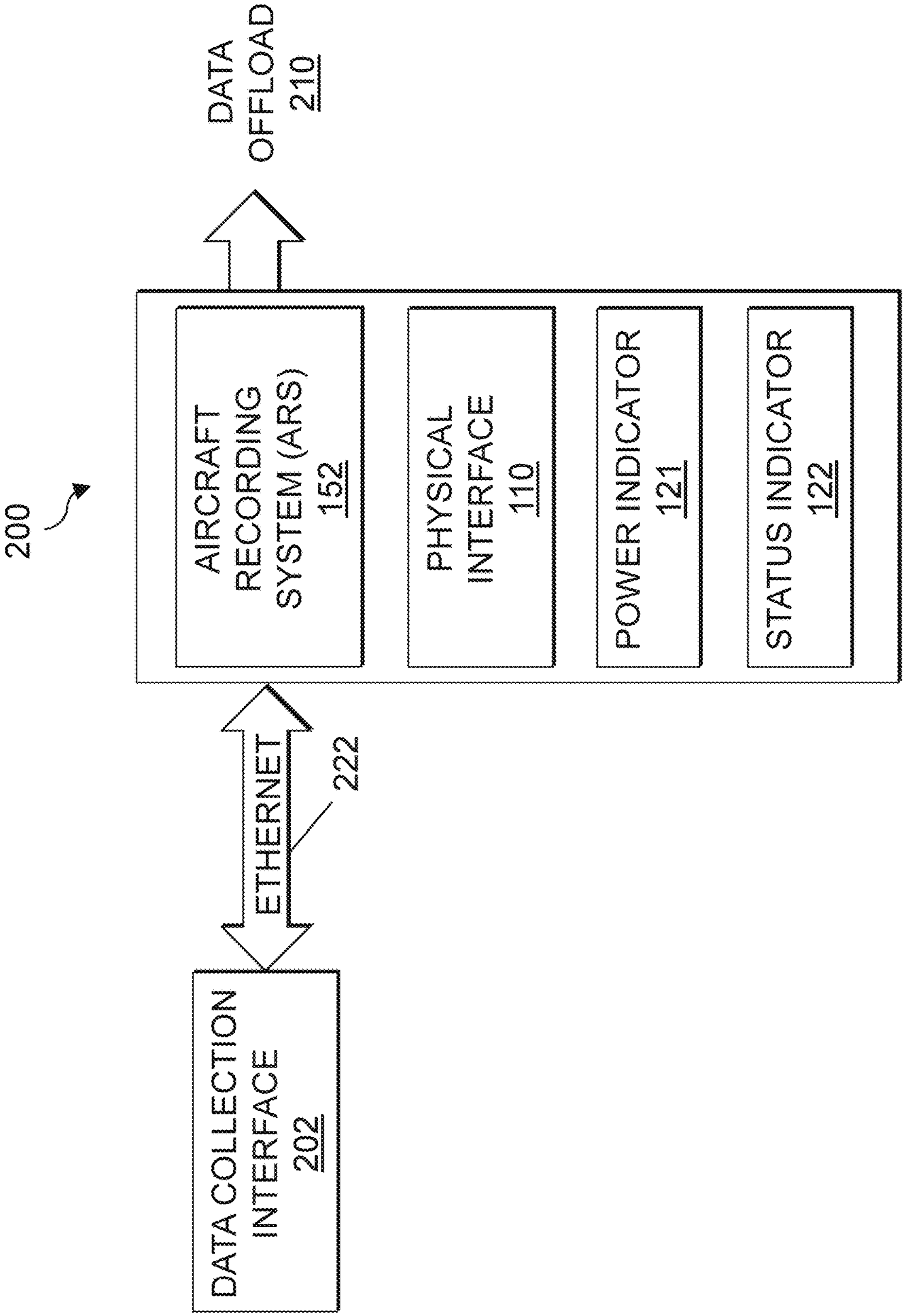
FIG. 2 depicts a block diagram of another embodiment of an aircraft data recording device.

FIG. 2 is a block diagram illustrating an aircraft recording system (ARS) device 200 having configurable real-time file offload prioritization. ARS device 200 is an example of ARS device 100 of FIG. 1. Items enumerated with like numerals are the same or similar and their description may not be repeated accordingly. ARS device 200 comprises a power indicator 121 and a fault indicator 122 both disposed on an outer surface (e.g., the façade) of the ARS device 200. Power indicator 121 and fault indicator 122 comprise separate and independent lights (e.g., LEDs). Additional details of ARS device 100 and 200 are described in the incorporated-by-reference and co-pending U.S. Provisional Patent Application No. 63/585,496, entitled "Aircraft Recording System Context-Sensitive Interface for Rapid Configuration", and filed Sep. 26, 2023.

Exemplary statuses indicated with power indicator 121 and fault indicator 122 include but are not limited to the following: 1) the power indicator 121 is fully illuminated (e.g., solid on) and the fault indicator 122 is off when the power is on and no faults are detected; 2) the power indicator 121 is flashing and the fault indicator 122 is off when the power is on and data are being recorded; 3) both the power and fault indicators 121, 122 are flashing when a fault condition has been detected but the fault condition does not prevent recording of data by the ARS 152; 4) both the power and fault indicators 121, 122 are fully illuminated (e.g., solid on) when a fault condition has been detected and the fault condition is preventing recording of data by the ARS 152; 5) both the power and fault indicators 121, 122 are off when the ARS device 200 is powered off; and 6) the power indicator 121 is rapidly flashing and the fault indicator 122 is off when data are being written to a USB device via the data offload pathway 210.

In embodiments, data collection interface 202 may include data buses dispersed in remote locations (i.e., remotely located from the cockpit or another centralized computing station within the aircraft), which provides shorter wire paths from many input sources (e.g., LRUs, sensors, etc.) leading to an overall reduction in wire weight.

Data received by data collection interface 202 may include any diagnostics output from printed circuit boards (PCBs) on the aircraft (e.g., PCBs for a full-authority digital engine controller (FADEC), spoiler monitor, flap monitor, flap control, weight on wheels, dimming control, etc.). Additional data collection interfaces 202 may be added to the avionics diagnostics network by being communicatively coupled to an existing data collection interface 202 and thereby indirectly coupled to ARS 152. This provides a scalable architecture connectable to an unlimited number of data collection interfaces 202, providing a built-in capability to increase data input sources, as further described in co-pending U.S. Provisional Patent Application No. 63/583,900, entitled "Parallel Scalable Data Collection", and filed Sep. 20, 2023, which is herein incorporated by reference in its entirety.

Data collection interface 202 may comprise a configurable PCB having a field-programmable gate array (FPGA) communicatively coupled with a microcontroller unit (MCU) via a serial peripheral interface (SPI). A synchronous dynamic random-access memory (SDRAM) is operatively coupled to the MCU to provide instant-on data caching from the MCU prior to the data being transmitted to ARS 152. Data inputs/outputs going to/from the FPGA may include but are not limited to ARINC 429 data inputs, ARINC 429 data outputs, ARINC 717 data input, ARINC 717 data output, and discrete input/outputs. In embodiments, ARS 152 includes a built-in data collection interface 202 (not shown) which is communicatively coupled with one or more external data collection interfaces 202 via ethernet pathway 222.

Data provided to ARS 152 may be in the form of output User Datagram Protocol (UDP) data frames. Commands provided to the MCU comprise input UDP commands. The data may be transmitted between the MCU and ARS 152 over ethernet, such as 100Base-TX for example, which is a 100 Mbit/s baseband signaling fast ethernet connection. Alternatively, a 1 Gbps ethernet link may be used.

Data stored in ARS 152 may be offloaded via data offload pathway 210, which includes but is not limited to a removable mass storage module, a wired or wireless network connection such as a LAN, 802.11 WiFi, LTE or GSM cellular connection, the Iridium satellite constellation, or through a wired transport mechanism such as universal serial bus (USB) for example. In embodiments, ARS 152 includes three SIM card slots with two being for cellular carriers and one for Iridium.

Figure 3:
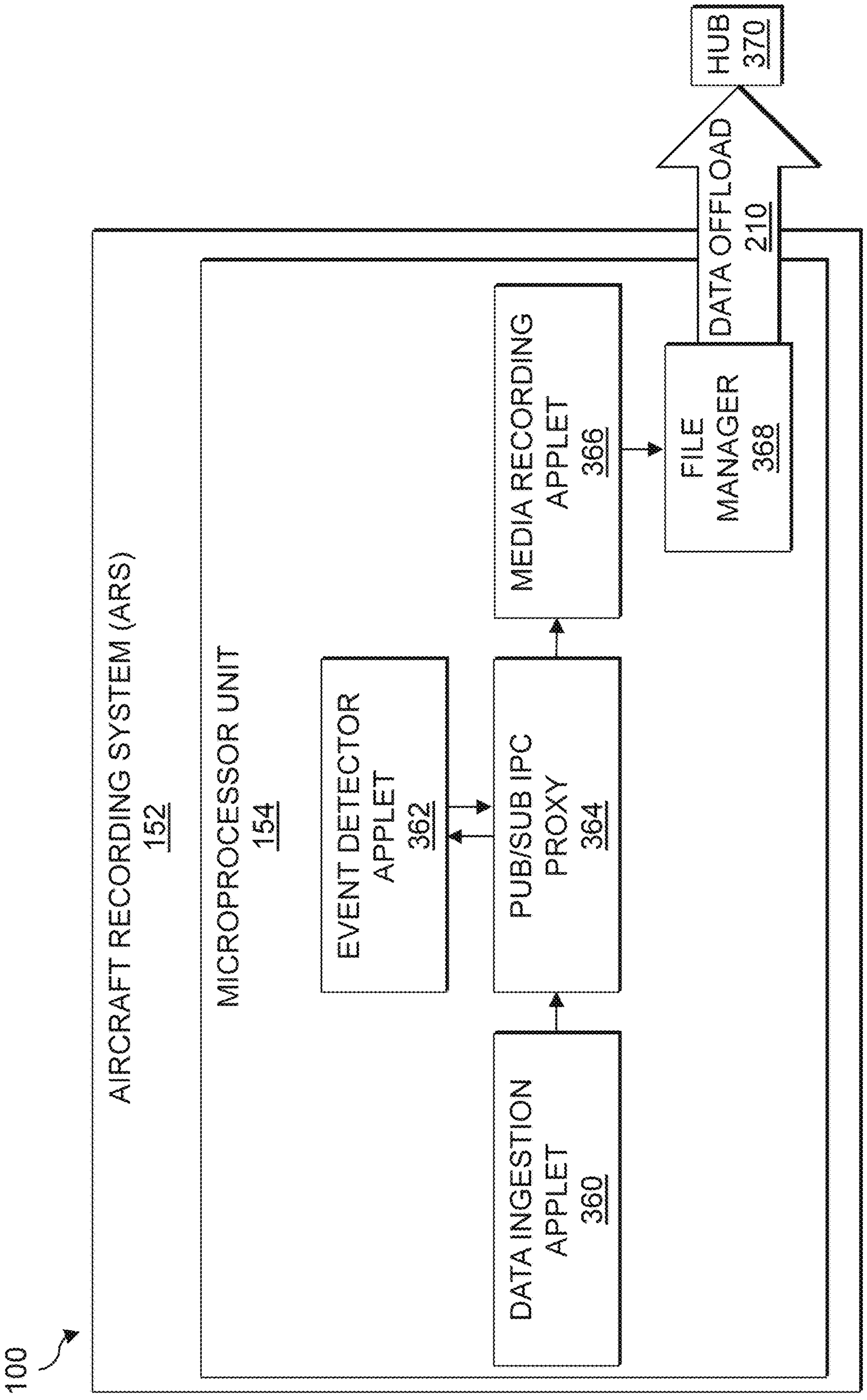
FIG. 3 depicts an architectural block diagram illustrating an example of mechanisms for gapless asynchronous data recording that allows data to be buffered and subsequently synchronized, thereby preventing formation of gaps within data files due to process interruptions caused by write fails.

FIG. 3 is a block diagram depicting exemplary processes running internally within the ARS 152. Specifically, ARS 152 comprises a memory configured for storing software instructions (applets) and a processor configured for executing the software instructions. In certain embodiments, ARS 152 comprises a microprocessor unit (MPU) 154 that has a quad core arm microprocessor running a custom embedded Linux distribution. The MPU 154 also comprises its own random-access memory (RAM). As shown in FIG. 3, a data ingestion applet 360, an event detector applet 362, a Publication/Subscriber (Pub/Sub) Interprocess Communication (IPC) proxy 364, a media recording applet 366, and a file manager 368 each comprise a configurable real-time process stored in and executed by the MPU 154. The processes are each run as a service on a Linux operating system.

The data ingestion applet 360 receives data in ethernet packets via ethernet connectivity pathway 222. The data are parsed and formatted by the data ingestion applet 360, then sent to the Pub/Sub IPC proxy 364. The Pub/Sub IPC proxy 364 allows any applet to subscribe to a piece of data. In this manner, any applet interested in some piece of data can subscribe and will receive a message related to that piece of data if subscribed. Applets can be configured to subscribe to any topic. An envelope is a string of numbers and periods used to tag a particular piece of data, which enables an applet to subscribe to a detailed piece of data (e.g., data from a particular sensor).

The media recording applet 366 is interested in all data, but some data are more important than others. Important information is detected with a state machine (e.g., logging flags and time stamps), which is embodied as the event detector applet 362 in the FIG. 3 embodiment.

The event detector applet 362 comprises a generically defined state machine configured to publish events. The published events get picked up by media recording applet 366. The event detector applet 362 applies tags to the recorded data (e.g., aircraft was flying). The event detector applet 362 subscribes to certain topics, runs inputs through the state machine, and if a certain sequence of events occurs as specified in a configuration file, a message is published.

Figure 5:
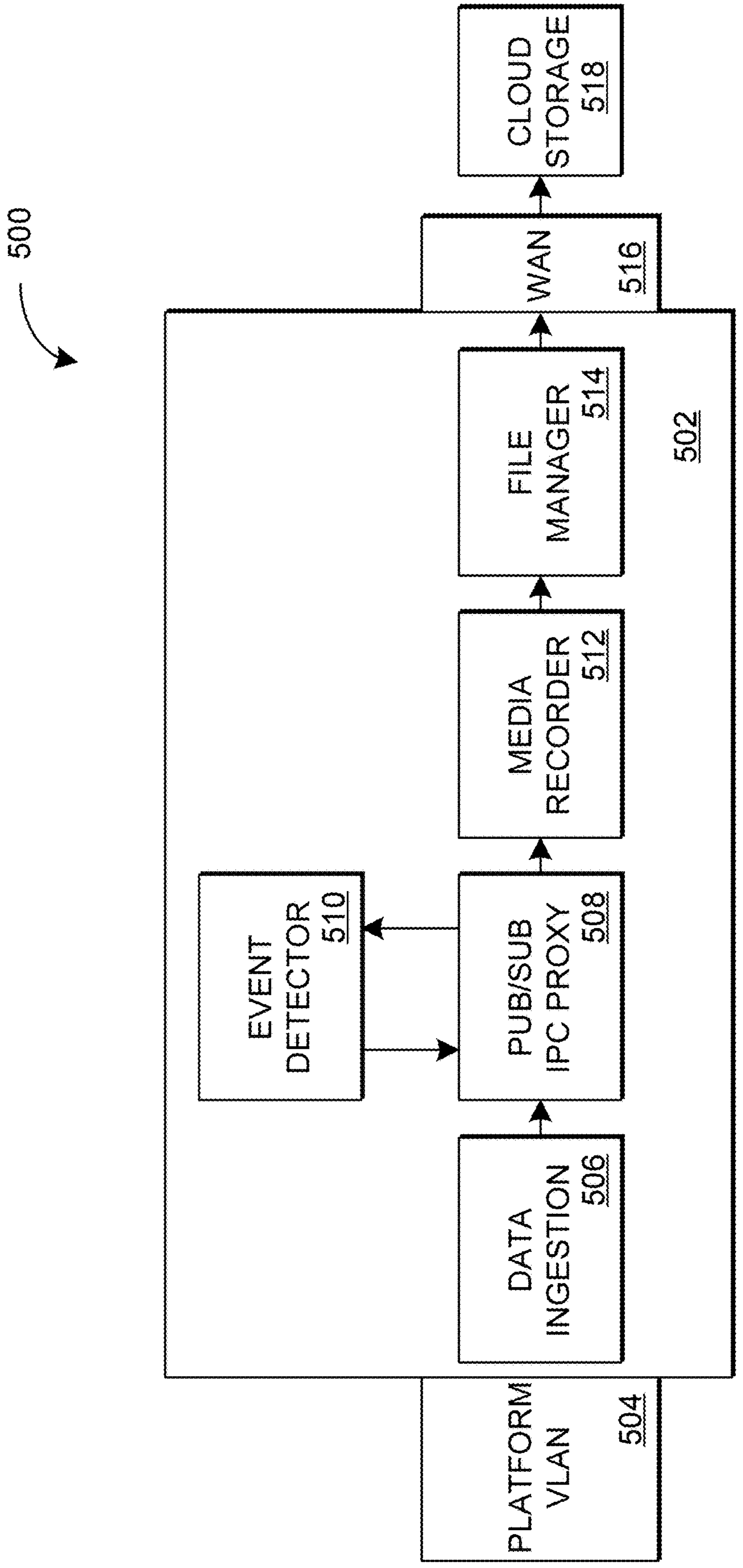
FIG. 5 is an example aircraft data recording flow diagram illustrating the flow of aircraft data via an aircraft data recording system that utilizes gapless asynchronous data recording.

An exemplary state machine flow diagram 500 for event detector applet 362 is shown in FIG. 5. Data first flows into the event detector via the subscriber socket. Once an envelope and its corresponding payload is received, a lookup is performed to determine what parameters that envelope feeds in a manner which is a one-to-many mapping (e.g., one envelope may be decoded into to multiple parameters). Once the parameters are decoded, their updated values are fed into one of two types of expressions. Which type it feeds depends on the parameters type, integer or byte array. If the parameter's type is an integer, it may feed a relational expression in which it is compared to the value of another parameter or a constant value with a greater than, less than, or equals operator. If the parameter's type is a byte array, it may be fed into a binary mask expression where certain bits are checked whether or not they are asserted. The output of both relational and binary mask expressions are a "signal" which evaluates to true or false. A signal may feed a Boolean expression or a debounce expression. A Boolean expression is used to perform Boolean logic on one more signals using the operators NOT, AND, OR, NOR, NAND, and XOR. Debounce expressions are used to generate the debounced version of a signal, such that any glitches in the input data can be filtered out. Finally, signals feed the inputs to state machines. A state machine is composed of one or more states where each state may be triggered to move to another state by any of the signals previously defined. States may be defined to be passive or active. Passive states will generate no outputs; whereas active states generate outputs by publishing an event message that includes a unique parameter used to identity that state, as well as the time of the event and other helpful contextual information surrounding the event.

The file manager 368 comprises offload policies used to prioritize which data to send especially if the data offload pathway 210 is bandwidth limited. In embodiments, the file manager 368 prioritizes data based on the tags and bandwidth availability. The file manager 368 is configurable depending on the configuration file which may be received upon a most recent connection to the internet. Decisions relating to which data to offload first are needed when more than one option for downloading data are available. By simply updating the configuration file, the prioritization upon which the file manager 368 operates is configurable. In some embodiments, the file upload policies are provided as configuration files via the digital device twin for the file manager 368 upon connection to the internet. In embodiments, a device twin operates in a cloud-based server. The device twin may be used by a user to see what data sets are available onboard the ARS device 100/200.

Data transmitted via data offload pathway 210 are received by a data hub 370. Data hub 370 may include any back end generic resting place for the data. For example, the data hub 370 may comprise a server, cloud storage, or Internet-of-Things (IoT) platform. In some embodiments, the data hub 370 is a Microsoft Azure IoT hub. Once a data pathway is established, configurable policies are readable via the Data hub 370. Users may then access data via data hub 370 in various ways (e.g., via an internet connection).

Figure 4A:
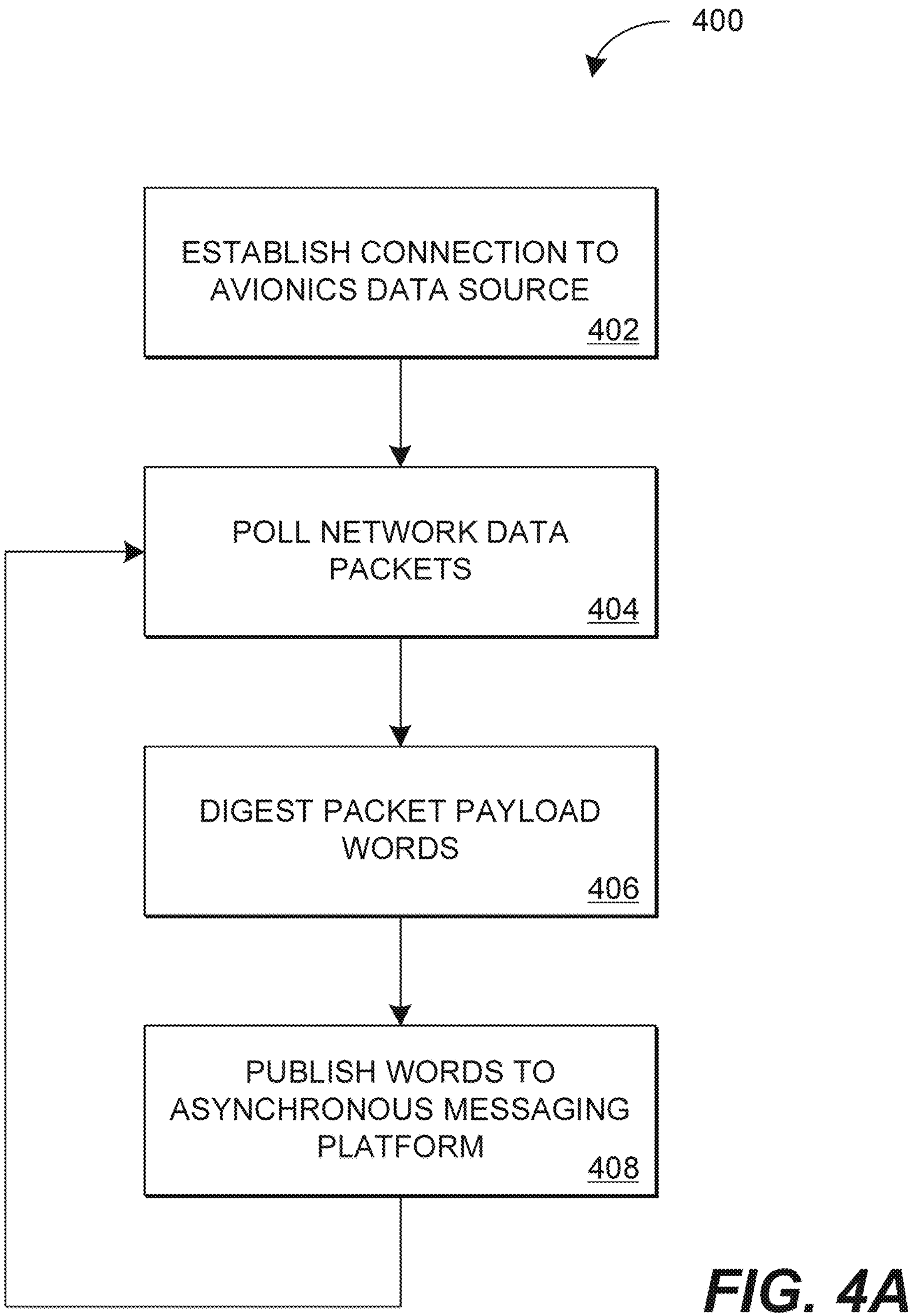
FIG. 4A depicts a flow diagram illustrating an ingestion process in a gapless asynchronous data recording method, in an embodiment.

FIG. 4A depicts a flow diagram 400 illustrating an ingestion process in a gapless asynchronous data recording method, in an embodiment. In step 402, a connection is established between an avionics data acquisition system to an avionics data source. In some embodiments, the aircraft data acquisition system captures the plurality of aircraft data events by way of a plurality of avionics sensors. In an example of step 402, plurality of aircraft data events may be cached by way of volatile memory such as SDRAM over the course of operation of an aircraft. In some cases, such aircraft data events may be of critical nature such that failure to record the aircraft data events for any reason would result in loss of important aircraft status information.

Examples of data to cache include status information for systems behaving normally as well as faults, including but not limited to FADEC data, avionics data, and data from diagnostics collector PCBs. Other data to cache may be related to a cabin door control and monitor system that assists with opening/closing the cabin door. The control and monitor circuitry are energized when the door unlatches and starts to fall open. Various conditions/faults may be cached as this system is coming online (e.g., via signals from proximity switches). Another example includes voltage/bus monitoring. After a main bus is turned on, a variety of systems may still be booting up. The circuit boards that monitor the bus voltages come online immediately upon power on enabling related information to be cached prior to recording by ARS 152. For example, information related to transient current spikes and voltage drops during the power on phase of various systems may be cached.

In step 404, network data packets associated with the avionics data are polled. The data packets may be polled by way of a data acquisition endpoint associated with the aircraft data acquisition system and located in the aircraft. In an example of step 404, aircraft data events are cached in SDRAM so that they may be subsequently retrieved by one or more microprocessor units. In some embodiments, a loosely-coupled embedded system may be communicatively coupled with ARS 152 by way of one or more conventional (or subsequently discovered) wired or wireless networks, such as mobile telecommunication networks, Ethernet, or IEEE 802.11 (Wi-Fi standards-based) network connections. Such connections may also include any other standards-body-based or de facto standard wired- or wireless-based network connections capable of relaying cached information from an ARS 152 to an external embedded microcontroller system.

In step 406, packet payload words may be digested to produce packet payload digest words by way of at least one digesting mechanism. Such digesting mechanisms may involve applying one or more hashing algorithms to compute a fixed-length string representing a unique fingerprint of packet payload content. Such hashing algorithms may include Secure Hash Algorithm (SHA)-256, a cyclic redundancy check (CRC) such as 32-bit CRC, and/or Message Digest Algorithm 5 (MD5). In this way, each piece of data may be split up and published to the pub/sub proxy separately. Data Packets received in step 404 may contain a mixture of ARINC-429, ARINC-717, discrete, and CAN words. In some embodiments, step 406 splits the data packets into separate, smaller payloads. In some embodiments, these may be implemented according to C-language data structure definitions such as struct definitions. For A429, A717, CAN, discrete, UART, and CDSB, many such data structures are six bytes long where the first byte corresponds to a source channel, the second byte is a CRC for data integrity checks and the remaining four bytes include the data to be delivered.

In step 408, digested packet payload words may be published to an asynchronous messaging platform that facilitates subscribing to channels associated with the asynchronous messaging platform as well as facilitating publishing messages and delivering the messages to subscribers. In some embodiments, the asynchronous messaging platform may involve a message broker. In some alternatives a brokerless messaging platform may be employed such as ZeroMQ.

Figure 4B:
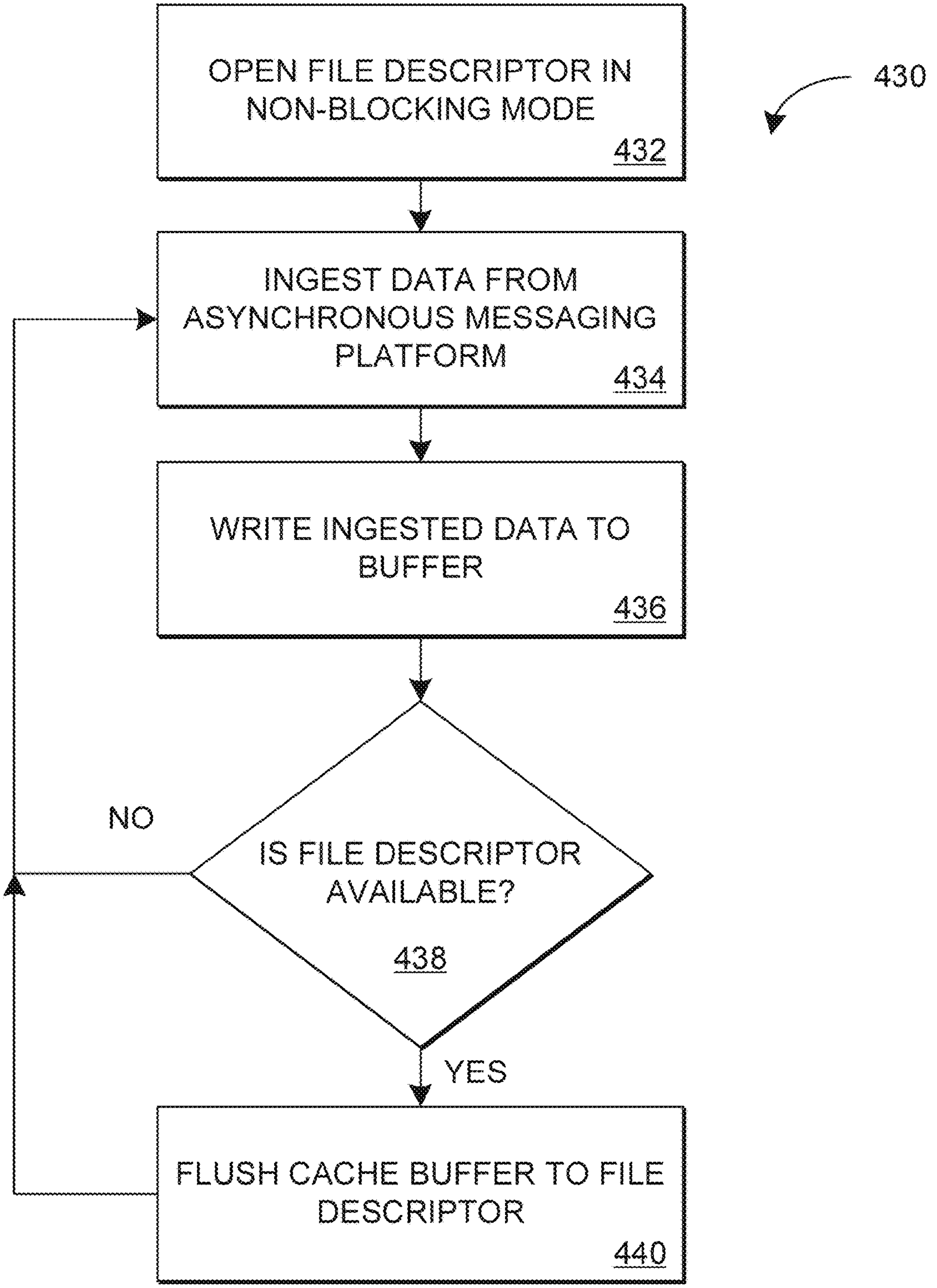
FIG. 4B depicts a flow diagram illustrating a recording process in a gapless asynchronous data recording method, in an embodiment.

FIG. 4B depicts a flow diagram 430 illustrating a recording process in a gapless asynchronous data recording method, in an embodiment. In step 432, a file descriptor is opened in non-blocking mode, meaning that data writes to a particular file descriptor will write as much data into a particular file as possible under the circumstances and then return without waiting to complete a write of the entire size requested. Accordingly, file descriptor opened in a non-blocking mode may store as few as zero bytes, or as much as the full number that was requested. In some embodiments, a periodic sync of the storage media may be accomplished by an operating system, such as for example, Linux. On a periodic basis the operating system may take control of the file descriptor which causes user space write requests to block if the file descriptor is in blocking mode and return an error if the file descriptor is in non-blocking mode until the sync completes.

In step 434, data are ingested from the asynchronous messaging platform. In some embodiments, the ingestion of data from the asynchronous messaging platform may involve receiving data from a messaging platform from a channel to which the receiver has subscribed. The ingestion may occur in a user space program or process, outside of an operating system kernel. Next, in step 436, the ingested data may be written to one or more data buffers in user space that may be statically or dynamically allocated. At test 438, it is determined whether a file descriptor is available. If not, execution proceeds back to step 434. If yes, execution proceeds to step 440, at which point the cache buffer is flushed to the allocated file descriptor.

Figure 4C:
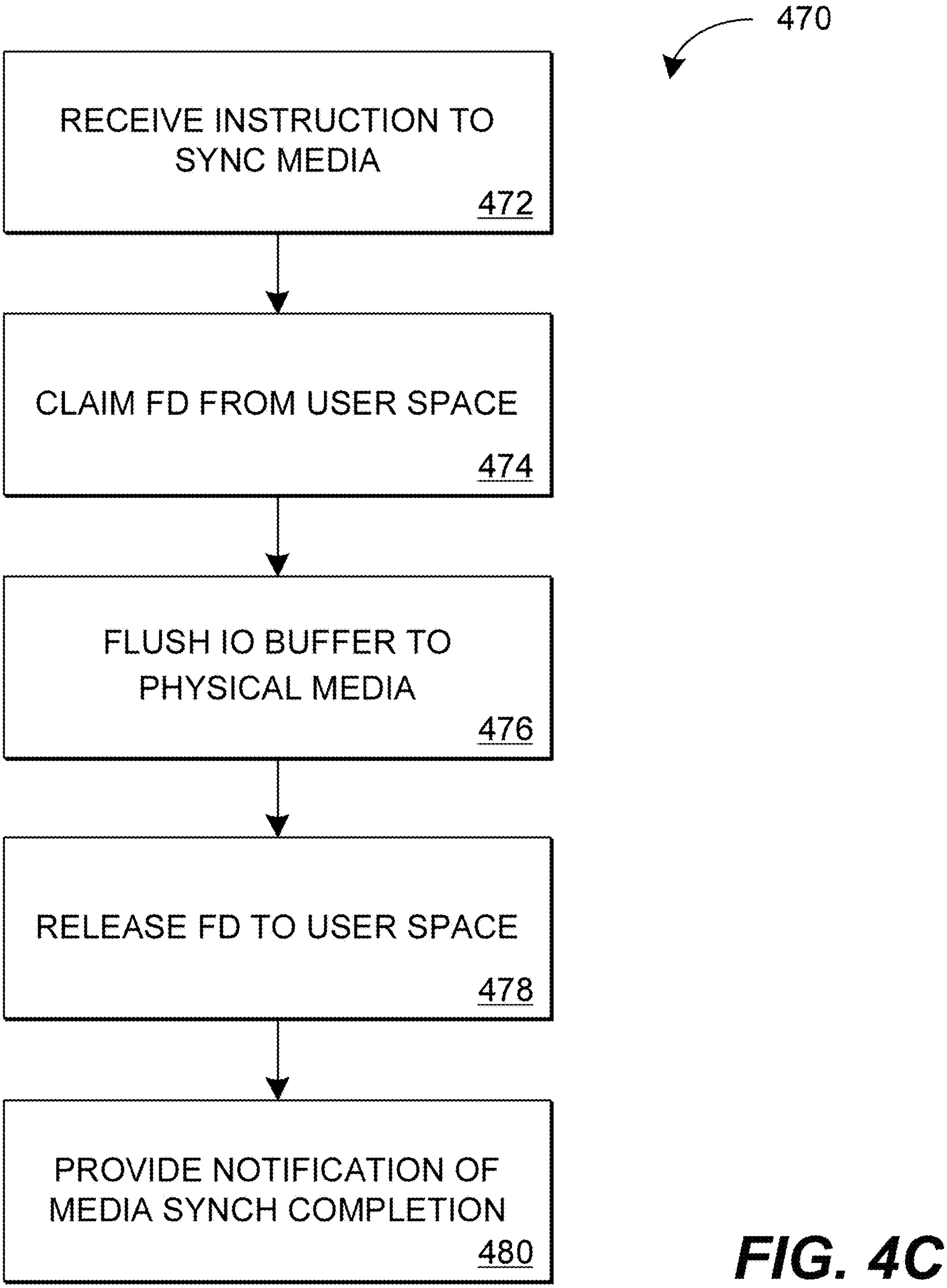
FIG. 4C depicts a flow diagram illustrating operating system kernel level input and output operations in a gapless asynchronous data recording method, in an embodiment.

FIG. 4C depicts a flow diagram 470 illustrating operating system kernel level input and output operations in a gapless asynchronous data recording method, in an embodiment. In some embodiments, processes associated with flow diagram 470 are carried out in kernel space. In some such embodiments, such processes may be implemented in connection with a kernel module. In step 472, an instruction is optionally received to sync media to persistent storage. In alternative embodiments, no instruction may be received, and synchronization may be performed in connection with a determination that an underlying system or processor has idle time.

Next, in step 474 a file descriptor may be claimed from user space for the purpose of persisting the associated avionics data. Storage media consistent with the present teachings may be formatted to a journaling file system, such as for example, Linux ext3/ext4, which may be configured to have a sync interval of five seconds. Under such a configuration, such a user space application writes to the file descriptor 80 times per second, with such writes not being written to the media, rather they are buffered by the operating system for five seconds total or 400 writes at 80 times per second. At the end of this five second interval, a journaling file system driver may automatically flush the operating system buffer to persistent storage, such as a USB flash media. Such an automatic buffer flush effectively “claims” the file descriptor until the sync process completes, meaning any process that tries to write to the file descriptor will block until the operating system buffer is fully flushed (synced) to physical media. In earlier designs, the user space application was allowed to block while waiting for that sync to succeed. Blocking the time-series application meant the time required to sync the media was introduced as a variable-length gap in the time-series data. In the new design, the file descriptor is given a non-blocking attribute which allows it to return an error code to the user space application rather than blocking. The user space application may be configured to recognize this error code to mean the file descriptor is busy with sync and will internally buffer the data that would have been written. This internal buffer logic repeats on each write, buffering time-series data with no gaps until the sync completes and the entire internal buffer may be written to the file descriptor. This internal buffer logic allows the user space application to continue with its 80-per-second writes, eliminating the gap in the time-series data. Once, the file descriptor has been claimed from user space, in step 476, the corresponding input output buffer is flushed out to physical media by way of the kernel space process. Next, in step 478, the file descriptor is released to user space. The file descriptor is released when the operating system accomplishes syncing the operating system buffer to the physical media. This may be carried out asynchronously, so the corresponding timing is non-determinative, it completes when the kernel is able to queue the write and the USB flash media is able to accomplish the write. Finally, at step 480 a notification of media synchronization completion is provided to the recording process so that the associated buffers may be cleared and/or reused.

FIG. 5 is an aircraft data recording flow diagram 500 illustrating the flow of aircraft data via an aircraft data recording system that allows data to be buffered and synchronized later, thereby preventing formation of gaps within data files due to process interruptions caused by write fails. For example, aircraft data recording flow diagram 500 illustrates the flow of aircraft data being recorded via ARS 502 using data caching methods illustrated in connection with FIGS. 4A to 4C which enable avionics data to be acquired and/or cached in connection with ARS 502 so that embedded systems may process and/or synchronize avionics data without data loss at write-time.

Aircraft data may be provided via platform VLAN 504. For example, VLAN 504 may receive data from one or more external data collection interfaces 202 from FIG. 1. ARS 502 may include data ingestion system 506, pub/sub IPC proxy 508, event detector 510, media recorder 512, and file manager 514. In some embodiments, once avionics data has been persisted in connection with file manager 514, the associated data may be transmitted via WAN 516 to cloud storage 518.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An aircraft recording system providing gapless asynchronous data recording, the aircraft recording system comprising:

at least one aircraft data acquisition system operatively coupled to a data ingestion interface, wherein the aircraft data acquisition system captures avionics data regarding a plurality of events associated with operation of an aircraft;

at least one data acquisition endpoint associated with the aircraft data acquisition system and located remotely from the aircraft, the data acquisition endpoint capable of persisting the plurality of events associated with the operation of the aircraft;

at least one asynchronous messaging platform adapted to digest and publish a plurality of packet payload words;

at least one aircraft data caching system adapted to cache aircraft data by ingesting data from the asynchronous messaging platform, writing the ingested data to a cache buffer; and at least one aircraft data file persistence system adapted to persist the aircraft data files by claiming a data store access control mechanism, flushing the cache buffer to physical storage, and releasing the data store access control mechanism.

2. The aircraft recording system of claim 1, wherein the asynchronous messaging platform is a brokerless message queue with one or more publishers and subscribers.

3. The aircraft recording system of claim 1, wherein the plurality of data acquisition endpoints comprises a plurality of wireless or wired data network interfaces.

4. The aircraft recording system of claim 1, wherein the avionics data regarding a plurality of events associated with operation of an aircraft is composed as one or more data structures taking a form of one or more data files.

5. The aircraft recording system of claim 1, wherein the data file persistence system is implemented as an operating-system-level kernel module.

6. The aircraft recording system of claim 1, wherein the at least one aircraft data caching system is an aircraft data file caching system.

7. The aircraft recording system of claim 1, wherein the cache buffer is flushed to a file descriptor based on a determination that the file descriptor is available for writing.

8. A method for providing gapless asynchronous data recording, the method comprising:

establishing one or more connections to one or more avionics data sources;

continually polling network data packets that are received from the one or more connections to one or more avionics data sources by way of a plurality of data acquisition endpoints;

digesting a plurality of packet payload words associated with the network data packets;

publishing the plurality of packet payload words to an asynchronous messaging platform;

ingesting the plurality of packet payload words from the asynchronous messaging platform to produce ingested data;

writing the ingested data to one or more cache buffers;

based on a determination that a file descriptor is available flushing the cache buffer to the available file descriptor;

based on an instruction to sync the avionics data to physical media, claiming the file descriptor;

flushing the cache buffer to physical storage; and releasing the file descriptor.

9. The method of claim 8, wherein the asynchronous messaging platform is a brokerless message queue with one or more publishers and subscribers.

10. The method of claim 8, wherein the plurality of data acquisition endpoints comprises a plurality of wireless or wired data network interfaces.

11. The method of claim 8, wherein the avionics data regarding a plurality of events associated with operation of an aircraft is composed as one or more data structures in a form of one or more data files.

12. The method of claim 8, wherein an associated data file persistence system is implemented as an operating-system-level kernel module.

13. The method of claim 8, wherein an associated data file persistence system is compiled into an operating-system kernel binary.

14. The method of claim 8, wherein the physical storage comprises one or more removable mass storage modules.

15. One or more non-transitory computer-readable media storing computer-executable instructions that, when executed by a processor, perform a method for providing gapless asynchronous data recording, the method comprising:

establishing one or more connections to one or more avionics data sources;

receiving a plurality of network data packets from the one or more connections to one or more avionics data sources by way of a plurality of data acquisition endpoints;

digesting a plurality of packet payload words associated with the network data packets to produce one or more packet payload digests;

publishing the plurality of packet payload words to an asynchronous messaging platform;

ingesting the plurality of packet payload words from the asynchronous messaging platform to produce ingested data;

writing the ingested data to one or more cache buffers;

based on a determination that a file descriptor is available flushing the cache buffer to the available file descriptor;

based on an instruction to sync the avionics data to physical media, claiming the file descriptor;

flushing the cache buffer to physical storage; and releasing the file descriptor.

16. The non-transitory computer-readable media of claim 15, wherein the asynchronous messaging platform is a brokerless message queue with one or more publishers and one or more subscribers.

17. The non-transitory computer-readable media of claim 15, wherein the plurality of data acquisition endpoints comprises a plurality of wireless or wired data network interfaces.

18. The non-transitory computer-readable media of claim 15, wherein the avionics data regarding a plurality of events associated with operation of an aircraft is composed as one or more data structures in a form of one or more data files.

19. The non-transitory computer-readable media of claim 15, wherein the packet payload digests are computed by means of applying one or more hashing algorithms.

20. The non-transitory computer-readable media of claim 19, wherein the one or more hashing algorithms includes a cyclic redundancy check algorithm.

* * * * *